Figure 1:
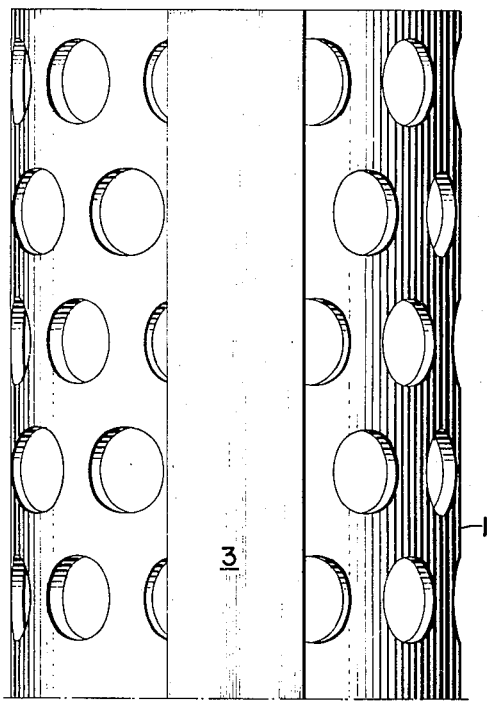

May 22, 1956  G. E. BRANDT  2,747,007

ELECTRODE FOR GALVANIC CELLS

Filed Aug. 15, 1951

INVENTOR:
GUSTAF ERIC BRANDT

BY Richardson, David and Verdon

ATTORNEYS

United States Patent Office 2,747,007
Patented May 22, 1956

2,747,007
ELECTRODE FOR GALVANIC CELLS

Gustaf Eric Brandt, Nol, Sweden, assignor to Aktiebolaget Tudor, Stockholm, Sweden, a Swedish joint-stock company Application August 15, 1951, Serial No. 241,929

2 Claims. (Cl. 136—14)

This invention relates to electrodes for galvanic cells, such as electric accumulators of the lead-acid type having positive plates each comprising a number of vertical rods of conducting material which are interconnected and held in laterally spaced relationship by horizontal transverse connecting members, with a disintegrable mass of active material pressed around each of the different rods, the active material being surrounded by a tubular electrolyte permeable cover or coating of insulating material. Hitherto such covers or coatings have consisted of slotted hard rubber tubes or of plaited or knitted glass wool fabric. However, the hard rubber tubes have proved not to be sufficiently resistant against breaking, and due to the stiffness of the material they are not sufficiently resilient under the pressure of the active material, nor do they adapt themselves to the external configuration of the mass, when the latter swells after having been used for some time.

Another disadvantage connected with the use of such hard rubber tubes is that particles of active material may fall out through the slots when the accumulator is in use.

On the other hand covers of glass wool do not possess the required stability and tensile strength. It has also turned out to be relatively difficult to assemble the ready-made covers on the active material, and in cases where the covers are produced by weaving or knitting the glass wool threads directly around the mass, the work will be complicated and expensive.

The difficulties and drawbacks stated above are eliminated by the present invention, which is principally characterized in that the cover for the active material of each tube unit consists of an electrolyte-permeable, thin-walled and somewhat flexible tube formed from a breakage and electrolyte-resistant material such as polyvinyl chloride or other similar synthetic plastic material.

According to a preferred embodiment of the invention one or more concentric tubular porous members or coatings formed of a woven, knitted or plaited glass-thread fabric or some other comparable, porous electrolyte-resistant material which are arranged inside the outer plastic tube. The porous fabric is permeable to the electrolyte but does not allow particles of active material to pass therethrough.

Besides being electrolyte-resistant and capable of adapting their shapes to that of the active material, the combined outer plastic tube and inner fabric covers according to the invention possess various other advantages among which the following may be mentioned. They are simple and therefore cheap to manufacture. They can be made lighter and with thinner walls than the hard rubber tubes previously used, and therefore the total weight of the electrode is reduced. They are easier to apply, and they are further unbreakable and sturdy and prevent effectively the escape of active material.

The accompanying drawing shows an embodiment of the invention which is illustrated by way of example.

Figure 2:
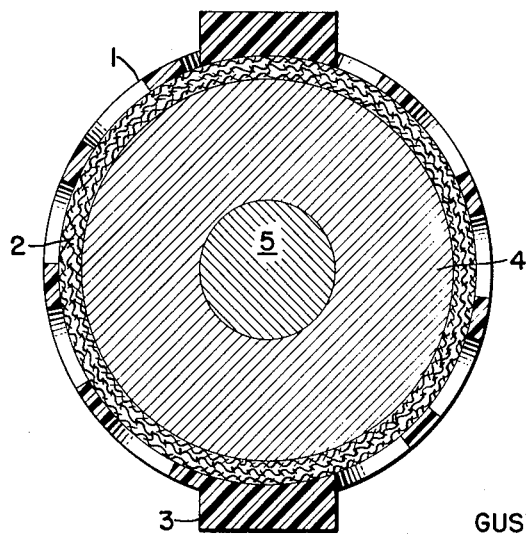

Referring to the drawing:

Figure 1 is a fragmentary view in side elevation showing the upper end portion of an outer perforated plastic tube in accordance with the invention without the porous fabric, the active material or the central rod; and Figure 2 is a plan view in transverse section taken through the tube of Fig. 1 with the porous fabric, the active material and the central rod all in place.

The outer perforated protective tube 1 of polyvinyl chloride or any other electrolyte resistant electrically insulative material which is somewhat flexible and resistant against breakage. On its inner wall surface the perforated tube 1 is provided with a coating 2 of flexible porous glass fabric. The term "fabric" as used herein includes all fabrics which are constructed, i. e., woven, knitted or plaited from threads formed of spun glass fibers or filaments.

The woven, knitted or plaited fabric construction of the coating 2 combines a maximum of tensile strength with a minimum of bulk as compared with unwoven felted or matted glass wool fibers. The outer tube 1 together with its inner fabric coating 2 form a cover for the active material 4 which is pressed around the central conductive rod 5 of the electrode. The mass of active material 4 is disintegrable and is adapted to react electrochemically with a liquid electrolyte (not shown). The outer tube is externally provided with diametrically opposed longitudinal strengthening ribs 3.

In the manufacture of the cover according to the invention a strip of thin perforated thermoplastic sheet material is preferably used. This strip is coated with a thin, smooth layer consisting of a porous glass fabric which is woven, knitted or plaited from threads which are spun or otherwise formed of glass filaments or fibers. This fabric coating is suitably attached to the perforated plastic strip. The strip with its porous glass fabric coating is then bent into cylindrical shape and the edges of the strip are welded together so that a tube is obtained. This unit consisting of the cover with its inner coating of woven, knitted or plaited glass thread fabric is considerably easier to manufacture than previously known structures and in addition it is stronger, cheaper, more flexible and lighter. By this combination of thermoplastic material sheet and porous woven, knitted or plaited glass fabric a composite tube of considerable strength is obtained. In the event that the active mass is to be pressed into the tube, this can be done without difficulty. In the case when the active mass is pressed around the rod the rigid cover can easily be passed over or applied around the active material even though the surface of the latter is rough and uneven. Moreover, the active material is brought into and retained in efficient contact with the electrically conducting central rod.

What I claim is:

1. An electrode of the class described, comprising a central rod of conductive material which is surrounded by a disintegrable mass of active material, said active material being adapted to react electrochemically with a liquid electrolyte, a somewhat flexible breakage resistant thin-walled hollow tube formed of a vinyl polymer, said tube having perforations formed in said wall to permit the free circulation of said electrolyte therethrough, said tube laterally enclosing said mass of active material, and a coating of flexible porous fabric constructed of threads formed of glass fibers, the porosity of said fabric rendering said fabric permeable to said electrolyte while effectively preventing the escape therethrough of any particles released from said mass of active material by said disintegration, said fabric coating being applied to the inner wall surface of said tube and extending continuously over said inner wall surface and over said perforations.

2. An electrode according to claim 1, wherein said vinyl polymer is polyvinyl chloride.

References Cited in the file of this patent

UNITED STATES PATENTS

| | | |
|---|---|---|
| 678,512 | Perry | July 16, 1901 |
| 1,159,021 | Hawkins | Nov. 2, 1915 |
| 1,966,237 | Dinin | July 10, 1934 |
| 1,990,976 | Booss | Feb. 12, 1935 |
| 2,168,366 | Slayter | Aug. 8, 1939 |
| 2,195,211 | Hall | Mar. 26, 1940 |
| 2,247,091 | Jumau | June 24, 1941 |
| 2,282,979 | Murphy | May 12, 1942 |
| 2,315,592 | Cargill | Apr. 6, 1943 |
| 2,420,456 | White | May 13, 1947 |

FOREIGN PATENTS

| | | |
|---|---|---|
| 604,829 | Great Britain | July 12, 1948 |
| 445,708 | Great Britain | Apr. 16, 1936 |